United States Patent [19]

Ghibu et al.

[11] Patent Number: 4,947,066
[45] Date of Patent: Aug. 7, 1990

[54] HIGH SPEED VARIABLE RELUCTANCE MOTOR WITH EQUAL TOOTH RATIOS

[75] Inventors: Bogdan A. Ghibu, Fullerton; Michael F. Bent, Monrovia, both of Calif.

[73] Assignee: Servo Products Co., Pasadena, Calif.

[21] Appl. No.: 265,728

[22] Filed: Nov. 1, 1988

[51] Int. Cl.⁵ .............................................. H02K 37/04
[52] U.S. Cl. ................................... 310/49 R; 310/269
[58] Field of Search ..................... 310/49 R, 162, 163, 310/164, 190, 191, 192, 193, 269

[56] References Cited

U.S. PATENT DOCUMENTS

| | | | |
|---|---|---|---|
| 4,316,111 | 2/1982 | Merki et al. | 310/269 |
| 4,496,886 | 1/1985 | Gordon et al. | 318/254 |
| 4,638,195 | 1/1987 | Lin | 310/49 R |
| 4,647,802 | 3/1987 | Konecny | 310/49 R |
| 4,758,752 | 7/1988 | Leenhouts | 310/49 R |

*Primary Examiner*—Patrick R. Salce
*Assistant Examiner*—Judson H. Jones
*Attorney, Agent, or Firm*—Skjerven, Morrill, MacPherson, Franklin & Friel

[57] ABSTRACT

A variable reluctance motor having untapered stator teeth and more rotor teeth than stator teeth. Two stator teeth are formed on each stator pole. The rotor tooth ratio (of tooth width to gap between teeth width) is equal to the stator tooth ratio for the two teeth on each stator pole. The rotor tooth ratio is in the range of about 0.70 to about 0.90, preferably about 0.78. With this configuration the motor has very low torque ripple. The stator teeth are magnetically saturated, so the motor can be operated at current levels above the saturation point, producing a linear torque to current function and high output torque.

24 Claims, 12 Drawing Sheets

−5° ROTATION

TORQUE vs SPEED CURVE

FIG. 7

HIGH SPEED VARIABLE RELUCTANCE MOTOR WITH EQUAL TOOTH RATIOS

BACKGROUND OF THE INVENTION

1. Field of the Invention

This invention relates to the field of variable reluctance (VR) electric motors, also called stepper motors, for high torque applications.

2. Description of the Prior Art

Variable reluctance motors (VR motors) are typically used as stepper motors because they can produce rotation in small, discrete steps. This mode of operation is inherent in the nature of VR motors. VR motors have a multi-pole rotor, with the separation between poles on the stator, the pitch, different from that on the rotor. The stator poles are electromagnetically excited in separate groups or phases and the rotor rotates until its poles reach a position of minimum magnetic reluctance relative to the excited stator poles. Upon energizing successive stator phases, the rotor turns a distance equal to the rotor pitch minus the stator pitch.

Other characteristics of variable reluctance motors including their low cost, small size and high torque-to-inertia ratio make VR motors attractive for use as general purpose servomotors. Their brushless construction makes VR motors particularly suitable for applications requiring spark-free operation.

However, two drawbacks have limited the use of variable reluctance motors as servomotors: torque ripple and a nonlinear torque to input current ratio (T/I). Torque ripple is the variation in maximum available output torque as the position of the rotor poles varies with respect to the stator poles. The nonlinear T/I ratio is inherent in the design of typical VR motors because they have no permanent magnets. Torque is created by the interaction of two magnetic fields, the rotor field and the stator field, both a function of current.

In the past, in order to optimize the torque characteristics of VR motors, the stator has been the determinative element in designing the motor. Stator design balanced magnetic flux leakage, caused by having too many teeth too close together, against minimum holding torque at the stable detent position, caused by having too few teeth. The stator was designed with many teeth of uniform cross section, to provide the maximum practical area at the tips of the teeth for the magnetic flux, while maintaining sufficient intertooth space for the winding coils. The ratio of the width of the stator teeth to the width of the gap between the teeth, called the stator tooth ratio, was typically 1.0 or more. The rotor design was dependent on the stator design, with the number and width of the rotor teeth chosen to suit the geometry of the stator. The ratio of the width of the rotor teeth to the width of the gap between the teeth, called the rotor tooth ratio, was about 0.5.

One improvement on the above-described VR motors is disclosed by Konecny in U.S. Pat. No. 4,647,802, filed June 13, 1985 and issued Mar. 13, 1987.

Figure 1:
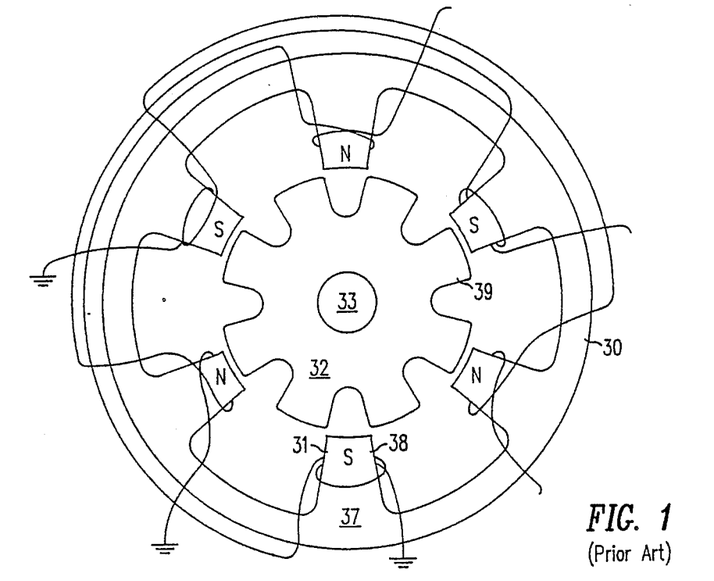
FIG. 1 a schematic front view of a prior art VR motor.

Konecny discloses as shown in FIG. 1 making the rotor 32 rather than the stator 30 the determinative element in the design and incorporating a tapered stator tooth 31 configuration. Rotor tooth 39 is untapered. The rotor 32 is mounted on shaft 33. The rotor tooth width ratio rather than the stator tooth ratio is the basis for optimizing torque characteristics, resulting in a larger rotor tooth ratio than in the prior art of about 0.78 and a smaller stator tooth ratio than in the prior art of about 0.5. The stator 30 has fewer teeth than the rotor 32, and the stator teeth 31 are tapered so they are wider at the base 37 than at the tip 31. Konecny uses just one stator tooth 31 per pole.

Another improvement is disclosed by Gordon et al. in U.S. Pat. No. 4,496,886, filed Nov. 8, 1982 and issued Jan. 29, 1985. Gordon et al. disclose a three-state driver for the stator winding of a variable reluctance motor. The driver allows a desired current level to be achieved with only a minimum of current ripple.

SUMMARY OF THE INVENTION

The present invention provides a VR motor which has very low torque ripple while maintaining a high peak torque, and also produces a linear torque/current ratio suited for servomotor applications.

The present invention includes the following features:

(1) Both the rotor and stator teeth are untapered.
(2) The rotor tooth ratio and stator tooth ratio are essentially equal; both are about 0.78.
(3) The stator has twelve Y-shaped poles, each with two teeth.
(4) More than one phase can be energized simultaneously during part of a motor revolution.
(5) The spacing of the stator teeth is uneven, because a larger gap is provided between the two teeth on adjacent poles than between the two teeth on one pole.
(6) A formula for calculating the optimum number of rotor teeth.

These features result in the following advantages:

(1) An operating speed range of up to about 1000 rpm (prior art VR motors typically have a range of up to 200 rpm for the same amount of peak torque as the present invention).
(2) Peak torque of about 160 lb. inches ($1.8 \times 10^8$ dyne cm).
(3) Continuous torque of about 115 lb. inches ($1.3 \times 10^8$ dyne cm) at 1 rpm, and about 80 lb. inches ($0.9 \times 10^8$ dyne cm) at about 1000 rpm.
(4) Torque ripple under 20%.
(5) A reduced outside diameter of the VR motor (including housing) of 6" (15.2 cm); prior art motors are 7 to 10 inches (17.8 to 25.4 cm) in diameter.

DETAILED DESCRIPTION OF THE INVENTION

Theory of Design

If one is to optimize the torque versus current curve for a VR motor, the stator is the principal element of concern. Choosing a multi-phase—multi-pole construction with many teeth and a particular geometrical shape improves the performance of VR motors. To overcome torque ripple one must energize more than one phase during those portions of the motor rotation where the torque from the individual energized phase is at a minimum.

The torque T developed on the shaft of a VR motor is $$T = \frac{FA^2 \left(r_1 + \frac{g}{2}\right) l}{k g} \text{ (lb. in)},$$

where:
FA=Number of ampere-turns/phase.
g=Width of the air gap.
$r_1$=Radius of the rotor.
l=Length of the rotor.
k=14,150,000-coefficient of conversion (joules and other values to lb.in).

The attractive force F1 between the stator tooth and rotor tooth is:

$$F1 = \frac{B^2}{2\mu_o} Sp,$$

where:
B=Flux density in the air gap
Sp=Surface area of the armature tooth over the air gap
$\mu_o$=Permeability of air Using a theoretical method and computer simulation it was possible to design the motor of the present invention, having the following performance specifications:

| | |
|---|---|
| Peak torque | 160 lb.in. (1.8 × 10⁸ dyne cm) |
| Continuous torque | 115 lb.in. (1.3 × 10⁸ dyne cm) at 1 rpm |
| Continuous torque | 80 lb.in. (.9 × 10⁸ dyne cm) at 1000 rpm |
| No load speed range | 0–1200 rpm |
| Torque ripple | <20% |
| Inductance/Phase | 0.090 [H] |
| Resistance/Phase | 3.4 [Ω] |
| No. of phases | 3 |
| No. of poles/phase | 4 |
| No. of rotor poles | 28 |
| Max. diameter | 6 inches (15 cm) |
| Length | 5.15 inches (13.08 cm) |
| Weight | 23 lbs. (10.4 kilos) |

The operating speed range from above zero to about 1000 rpm is one of the chief advantages of the present invention over the prior art. A prior art 150 lb. in. VR motor has a speed range of up to 200 rpm, and not over, because the torque is proportional to the inductance, and an inductance over a certain value limits the speed of the motor by increasing the time of the current rising. The relevant relationship is:

$$K_T L/R,$$

where:
L=Inductance
R=Resistance
$K_T$=Electrical time constant

Using a computer simulation and varying the dimensions, the number of poles and other parameters of the simulated motor make it possible to design a motor of the present invention which provides high torque at high speeds (200 to 1000 rpm).

Structure of the Invention

Figure 2:
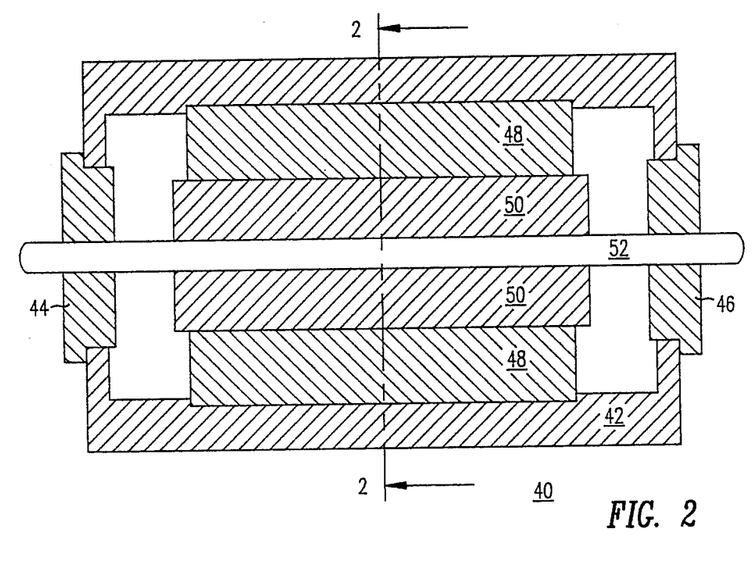
FIG. 2 shows a side view of the VR motor embodying the present invention.
Figure 3A:
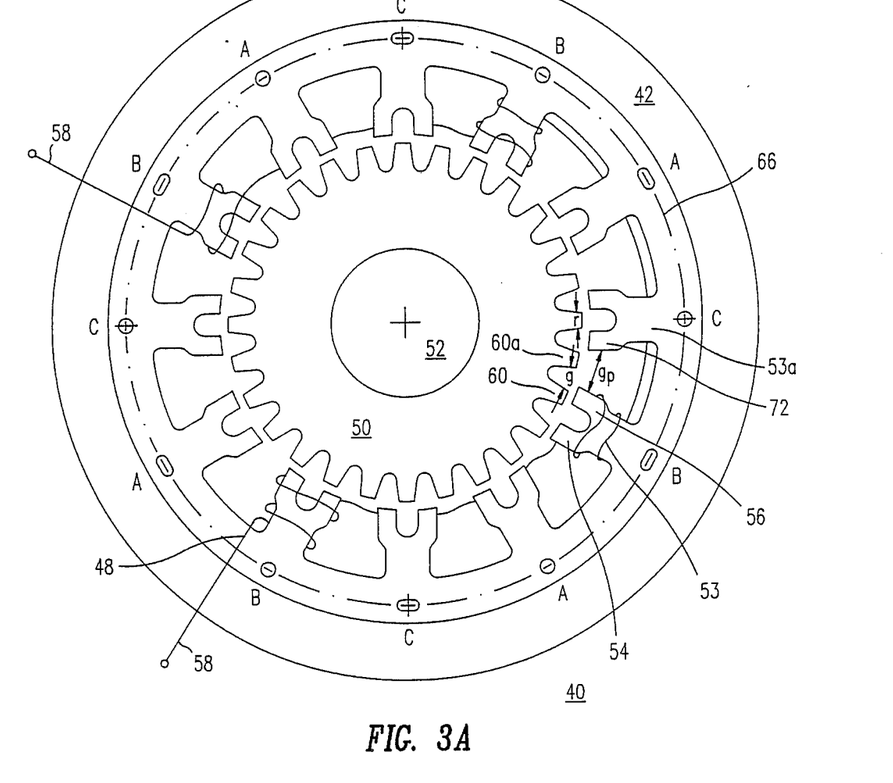
FIG. 3 shows a schematic front partial cross sectional view (not to scale) through line 2—2 of FIG. 2.
Figure 3B:
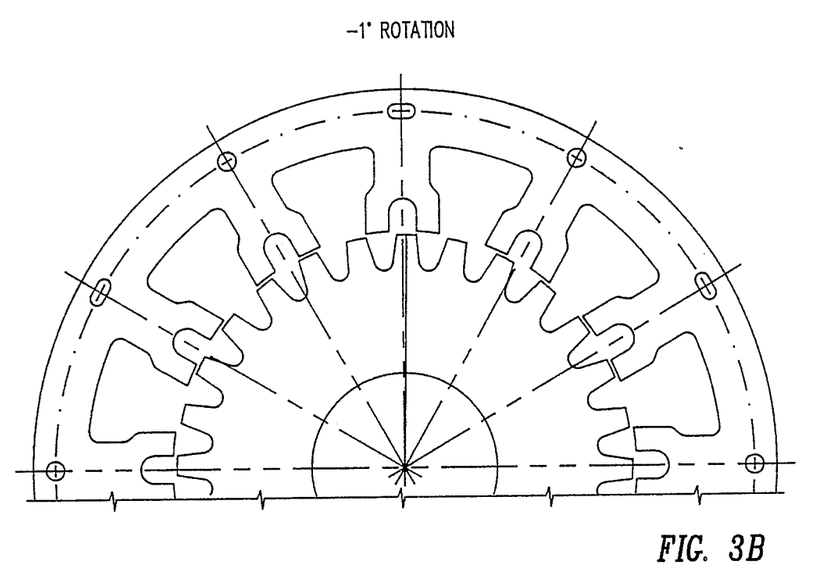
FIGS. 3B through 3F show successive relative tooth positions of a portion of the stator and rotor.
Figure 3C:
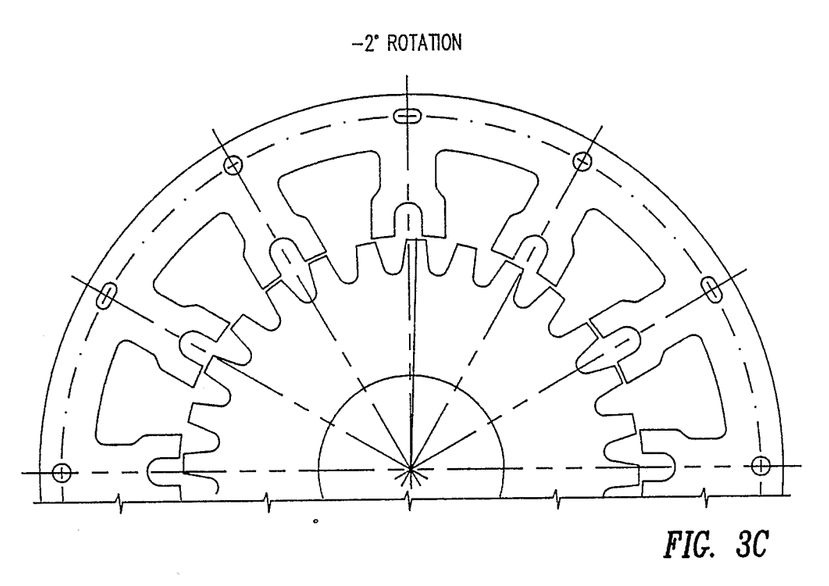
Figure 3D:
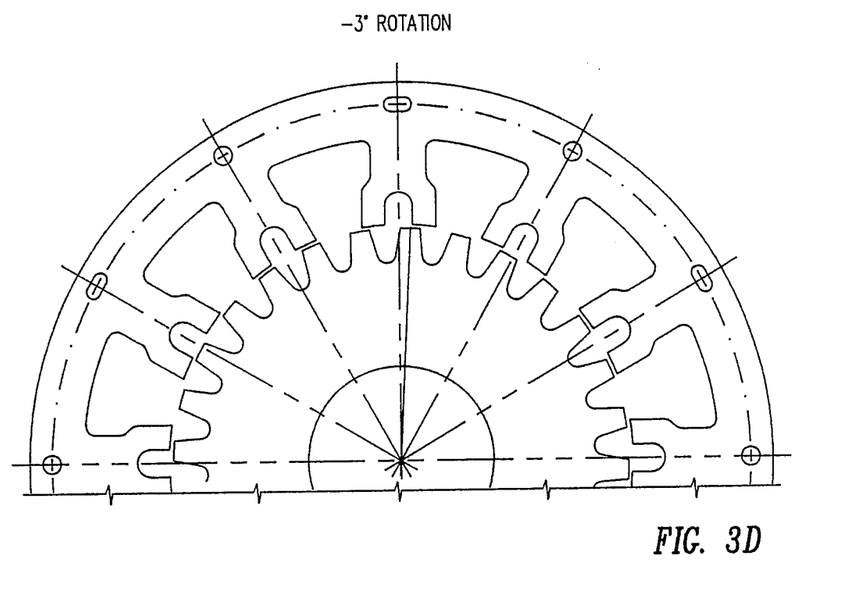
Figure 3E:
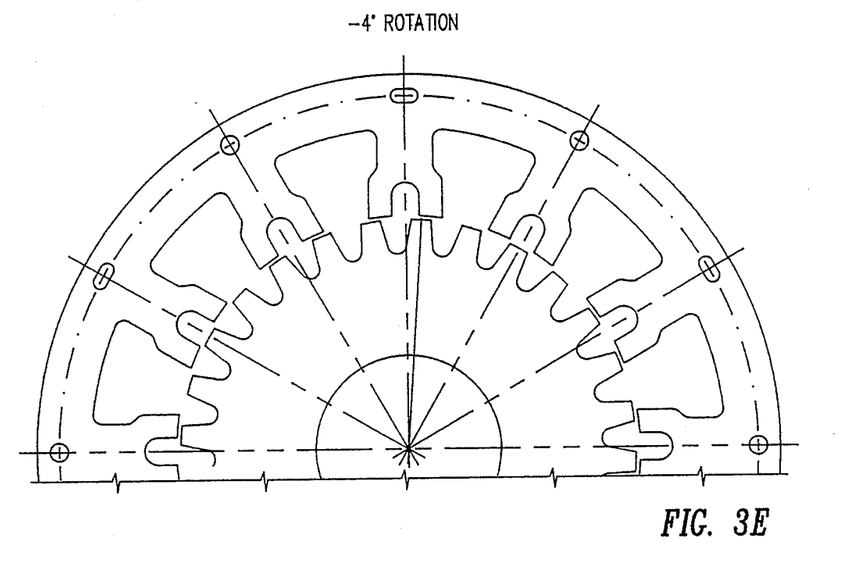
Figure 3F:
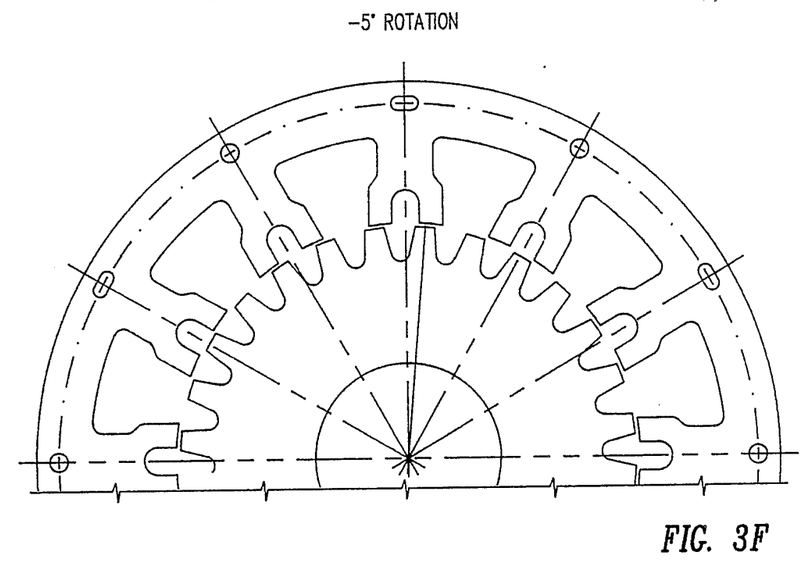

A variable reluctance motor which embodies the present invention is illustrated in FIGS. 2 and 3A. FIG. 2 is a side view of the motor and FIG. 3A (not drawn to the same scale as FIG. 2) is a schematic front partial cross-sectional view showing the configuration of the rotor and the stator. Referring to FIG. 2, motor 40 has an outer housing 42 which encloses the motor and which holds bearings 44 and 46 at each end thereof. Stator 48 is mounted inside housing 42. Rotor 50 is attached to shaft 52 which is mounted through bearings 44 and 46 for rotation concentric to stator 48. As seen in FIG. 3A, stator 48 in this preferred embodiment has twelve poles 53 on each of which are two teeth 54,56. Each of the Y-shaped poles 53 has a radial component that is the base of the "Y", and two radial components that are the arms of the "Y" and which are the teeth. Each of the stator poles 53 is wrapped with windings 58. Thus, the two teeth 54,56 on each pole 53 share windings 58.

Rotor 50 is attached to shaft 52 and has teeth 60, 60a which project outwardly from the shaft 52. Rotor teeth 60, 60a are equally spaced around the circumference of the rotor 50. The width r of rotor teeth 60 is such that the ratio of the width of the rotor teeth 60 to the width g of the space 62 between two teeth is about 0.78, with a preferred range of about 0.70 to about 0.90. Rotor 50 is constructed of laminated layers of transformer iron. Rotor teeth 60 have a width r at the tip of about 0.1725 inches (4.38 mm). The rotor has twenty-eight teeth in this preferred embodiment.

In this preferred embodiment, the rotor has an outside diameter of 3.50 inches (8.9 cm) and the stator has an outside diameter of 5.75 inches (14.60 cm).

Stator 48 has an annular outer portion 66 and twenty-four teeth 54,56 which project inwardly from the poles such as 53. Each stator tooth 54,56 is untapered, and has a width at the tip of 0.1725 inches (4.38 mm). The stator tooth ratio is substantially equal to the rotor tooth ratio, so it is in the range of about 0.70 to about 0.90, with 0.78 being preferred. Note, however, that this stator tooth ratio is only for the two stator teeth 54,56 on any one pole 53; the poles 53,53a and succeeding adjacent poles are spaced apart so that the gap $g_p$ between two teeth 56,72 on adjacent poles 53,53a is substantially greater than that dictated by the 0.78 stator tooth ratio. This greater spacing (which is 2.04 time the tooth width) is an important element of the present invention. Maximizing the gap between poles 53,53a et al. minimizes undesirable magnetic flux overlaps when two phases are energized simultaneously.

The untapered stator tooth structure provides a uniform flux density throughout the stator tooth so that magnetic saturation occurs throughout the tooth at the same magnetic field flux and excitation current. As shown in FIG. 3A, the stator teeth 54,56 are formed on Y-shaped pole 53 such that teeth 54,56 are untapered. The untapered stator teeth also prevent undesirable flux overlaps when adjacent poles are energized simultaneously.

There are twenty-eight rotor teeth 60,60a, et al. As is well-known in the art, the stator windings are excited in three phases. Thus the motor will produce 84 steps per revolution, so each step change in rotor position will be 4.285° upon each successive phase energization of the stator windings 58. The stator teeth 54,56 are wound in three phases of eight teeth (four poles) each.

The three phases are labeled A, B and C around the periphery of stator 48, but only the set of windings 58 for phase B are depicted in FIG. 3A in schematic fashion. In an actual motor, the windings 58 take up most of the gap $g_p$ between adjacent stator poles 53,53a et al. Each phase includes two pairs of diametrically opposed poles; when a phase is energized, the two pairs of diametrically opposing poles are excited with magnetic fields of opposite polarity. The rotor 50 is shown in the stable position it assumes when the phase B windings 58 are energized with rotor tooth 60 aligned with stator tooth 54, and rotor tooth 60a aligned with stator tooth 56.

Rotor 50 can be turned 4.285° counter-clockwise from the position shown in FIG. 3A by turning off phase B and turning on phase C. Rotor 50 can be turned 4.285° clockwise by turning off phase B and turning on phase A. Thus continuous counter-clockwise motion of the rotor 50 can be produced by sequentially energizing the phases in the order A, B, C, A, B, C, etc.; continuous clockwise motion can be produced by sequentially energizing the phases in the order in the A, C, B, A, C, B, etc. FIGS. 3B through 3F show successive positions of the rotor and stator during one step of rotation of 4.285° in a clockwise direction.

As an additional feature of the present invention, in order to minimize torque rippling, two phases may be energized simultaneously during those portions of the motor rotation when the torque from the individual phases is at a minimum.

This simultaneous energization technique is well known in the art. It is accomplished in the present invention by means of well-known computer software in the controller of the VR motor.

For increasing the torque of the motor and reducing the leakage flux between the energized pole and other rotor teeth, one uses a formula which determines the correct number of rotor teeth z as a function of the number of stator poles, number of teeth per pole and number of poles per phase:

$$z = p \times n_p + N,$$

where:
p = Number of stator poles.
$n_p$ = Number of teeth/pole.
N = Number of poles/phase.

This formula, part of the present invention, also provides for better utilization of the rotor.

Figure 4:
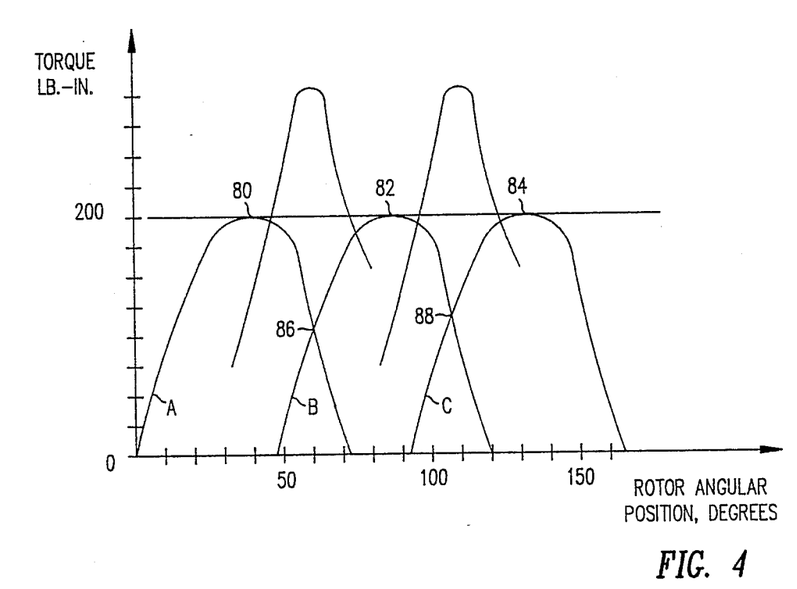
FIG. 4 shows a graphical representation of torque versus rotor position for the present invention.

FIG. 4 depicts the curve of torque versus rotor angular position in degrees the present invention. The three phases A, B, C are shown as the three lower large overlapping curves. The smaller upper curves are the simultaneous energization of a second phase when the torque of an individual phase would be at its minimum. The torque ripple is the difference between the high torque peaks 80,82,84 and the low torque valleys 86,88. The substantial overlap of the curves and the presence of the smaller upper curves smooths out the torque ripple, and gives enhanced performance over the prior art VR motors.

Figures 5, 6:
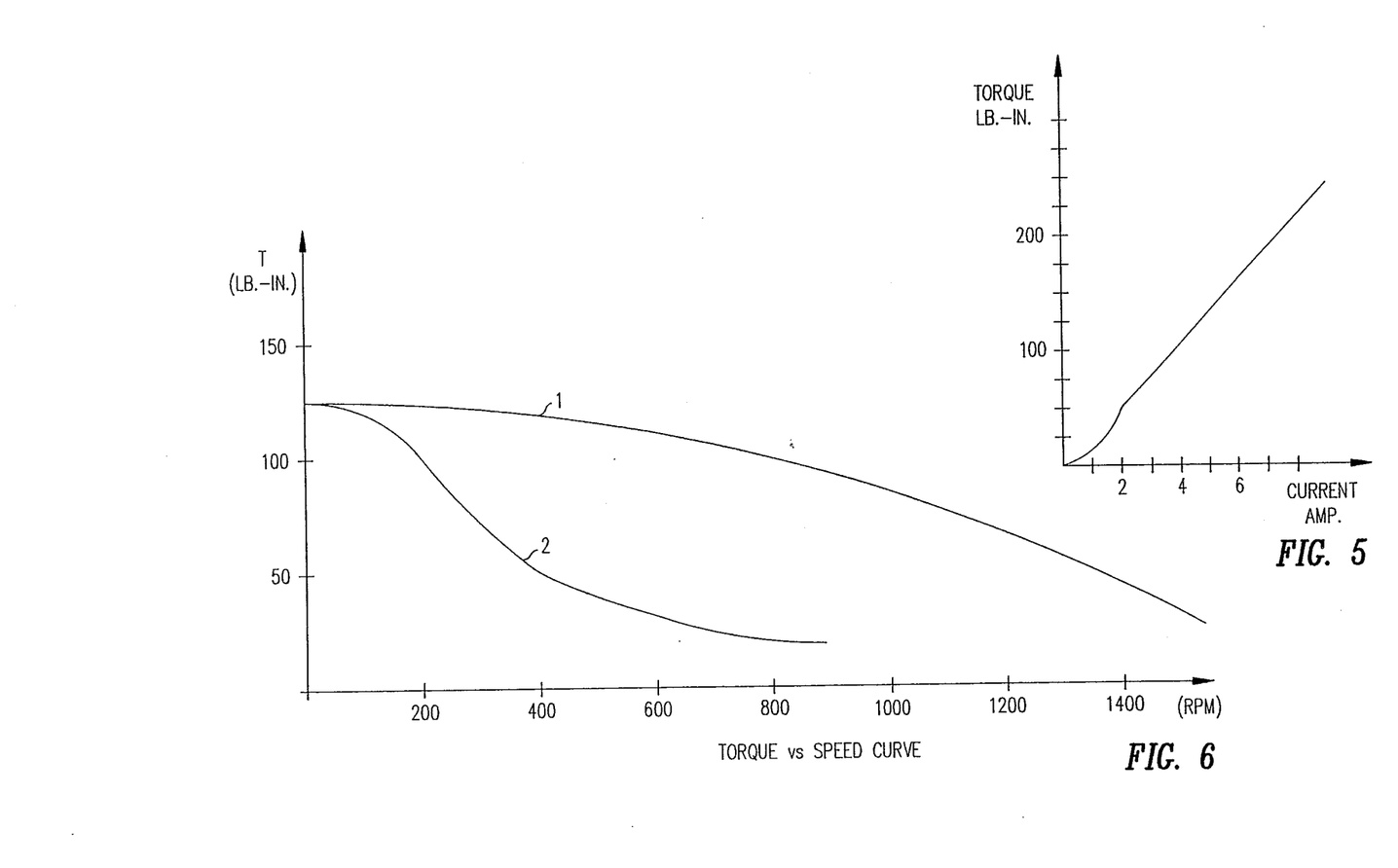
FIG. 5 shows a graphical representation of torque versus current for the present invention.
FIG. 6 shows a graphical representation of torque versus rotational speed for the present invention.

FIG. 5 depicts the torque versus current curve for the present invention. Over 2 amps (the tooth magnetic saturation point), the curve shape is that of a straight line, which is very desirable for servo applications. The present invention thus is designed to perform well at current levels above the saturation point, up to the resistance heating limit of the stator winding.

FIG. 6 depicts the torque versus rotational speed curve for the present invention. Torque decreases at higher speeds. As shown, for speeds up to about 1000 rpm, the torque produced is in the useful range.

Figure 7:
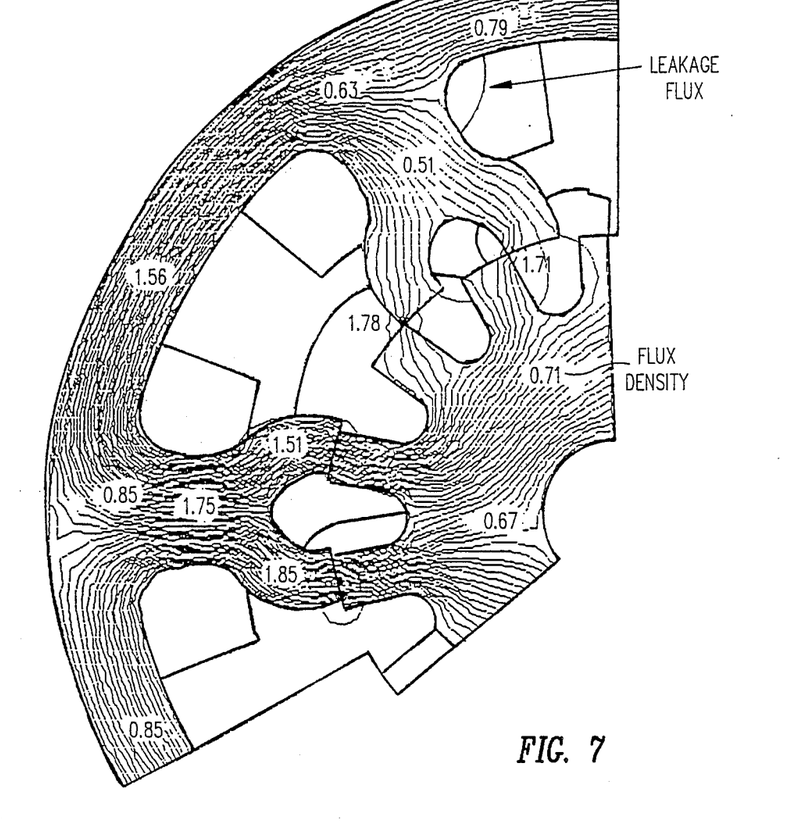
FIG. 7 show an exploded view of part of the rotor and stator with magnetic flux lines.

FIG. 7 depicts an exploded view of the magnetic flux lines through two stator poles and four stator teeth and four rotor teeth of the present invention when one stator pole (the lower one) is fully energized, and the second stator pole is partly energized. The flux density is depicted by the relative closeness of the flux lines.

The numbers on FIG. 7 represent relative magnetic flux density at various locations.

It will be understood by one skilled in the art that the above described embodiment is illustrative and not limiting. For instance, the number of stator teeth and rotor teeth can be chosen according to the desired application. Also, it would be possible to have just one stator tooth per pole. In this case, the stator tooth ratio would apply to stator teeth on adjacent poles. The scope of the invention is not to be determined by the above description, but only by the following claims.

We claim:

1. A variable reluctance motor with low torque ripple, suitable for operation as a servomotor, comprising:
    a stator having a body and a plurality of teeth formed on poles projected from the body;
    a rotor having a plurality of teeth and mounted for motion relative to the stator; and
    means for electromagnetically exciting the stator teeth to provide magnetic motive force to the rotor;
    wherein the rotor teeth and the stator poles are equally spaced, and a stator tooth ratio, being the ratio of the width of the tip of a stator tooth to the width of the gap between stator teeth, is substantially equal to a rotor tooth ratio, being the ratio of the width of the tip of a rotor tooth to the width of the gap between rotor teeth; and
    wherein the rotor tooth ratio is in the range of about 0.70 to about 0.90.

2. The motor of claim 1, wherein the rotor tooth ratio is 0.78.

3. The motor of claim 1, wherein two stator teeth are formed on each pole.

4. The motor of claim 1, wherein the width of the tip of a stator tooth is substantially equal to the width of the tip of a rotor tooth.

5. The motor of claim 1, wherein the number of rotor teeth is greater than the number of stator teeth.

6. The motor of claim 3, wherein the stator has twelve poles and the rotor has twenty-eight teeth.

7. The motor of claim 1, wherein the electromagnetic exciting means produces sufficient magnetic flux in the stator teeth to drive the stator teeth into magnetic saturation, and wherein each stator tooth is untapered in shape, producing a substantially linear torque to current function.

8. The motor of claim 7, wherein the stator has an outside diameter of less than about six inches.

9. The motor of claim 1, wherein the entire rotor is of laminated construction.

10. The motor of claim 6, wherein the twelve stator poles are excited in three phases, with two pairs of diametrically opposed poles excited with magnetic fields of opposite polarity in each of the phases.

11. The motor of claim 10, wherein at least two phases are excited simultaneously when the torque of the motor from one of the two energized phases is at a minimum.

12. The motor of claim 1, further comprising:
at least three sets of stator windings; and
phase control means for energizing simultaneously at least two sets of the windings during the times when the torque of the motor from one of the two energized sets of windings is at a minimum.

13. The motor of claim 1, wherein the stator poles are excited in phases, and each stator pole having the same number of teeth, the number of rotor teeth is equal to the total number of stator teeth plus the number of stator poles excited in each phase.

14. A variable reluctance motor with low torque ripple, suitable for operation as a servomotor, comprising:
a stator having a body or two teeth on each of a plurality of poles projecting from the body;
a rotor having a plurality of teeth and mounted for motion relative to the stator; and
means for electromagnetically exciting the stator teeth to provide magnetic motive force to the rotor;
wherein the rotor teeth and the stator poles are equally spaced, and a rotor tooth ration, being the ratio of the width of the tip of a rotor tooth to the width of the gap between the rotor teeth, is substantially equal to the stator tooth ratio, being the ratio of the width of a stator tooth to the width of the gap between stator teeth, for the two stator teeth on each pole; and wherein the rotor tooth ratio is in the range from about 0.70 to about 0.90.

15. The motor of claim 14, wherein the rotor tooth ratio is about 0.78.

16. A variable reluctance motor with low torque ripple, suitable for operation as a servomotor, comprising:
a stator having an annular body and a plurality of teeth projecting inwardly from the body;
a rotor mounted concentric with the stator for rotary motion relative to the stator having a plurality of teeth projecting outwardly from the rotor body toward the teeth of the stator, and
means for electromagnetically exciting the stator teeth in phases to provide magnetic motive force to the rotor;
wherein the rotor teeth are equally spaced and a stator tooth ratio, being the ratio of the width of the tip of a stator tooth to the gap between stator teeth, is in the range of about 0.07 to about 0.90.

17. The motor of claim 15, wherein the stator tooth ratio is about 0.78.

18. A variable reluctance motor with low torque ripple, suitable for operation as a servo motor, comprising:

a stator having an annular body and a plurality of poles projecting inwardly from the body;
at least one tooth on each pole;
a rotor having a plurality of teeth and mounted for motion relative to the stator; and
means for electromagnetically exciting the stator poles in phases to provide magnetic motive force to the rotor;
wherein each pole has the same number of teeth, and wherein the number of rotor teeth is equal to the total number of stator teeth plus the number of poles excited in each phase.

19. A variable reluctance motor with low torque ripple, suitable for operation as a servomotor, comprising:
a stator having a body and a plurality of teeth formed on poles projected from the body;
a rotor having a plurality of teeth and mounted for motion relative to the stator; and
means for electromagnetically exciting the stator teeth to provide magnetic motive force to the rotor;
wherein the rotor teeth and the stator poles are equally spaced, and a stator tooth ratio, being the ratio of the width of the tip of a stator tooth to the width of the gap between stator teeth, is substantially equal to a rotor tooth ratio, being the ratio of the width of the tip of a rotor tooth to the width of the gap between rotor teeth; and
wherein two stator teeth are formed on each pole and wherein the stator has twelve poles and the rotor has twenty-eight teeth.

20. A variable reluctance motor with low torque ripple, suitable for operation as a servomotor, comprising:
a stator having a body and a plurality of teeth formed on poles projected from the body;
a rotor having a plurality of teeth and mounted for motion relative to the stator; and
means for electromagnetically exciting the stator teeth to provide magnetic motive force to the rotor;
wherein the rotor teeth and the stator poles are equally spaced, and a stator tooth ratio, being the ratio of the width of the tip of a stator tooth to the width of the gap between stator teeth, is substantially equal to a rotor tooth ratio, being the ratio of the width of the tip of a rotor tooth to the width of the gap between rotor teeth; and
wherein the electromagnetic exciting means produces sufficient magnetic flux in the stator teeth to drive the stator teeth into magnetic saturation, producing a substantially linear torque to current function, and
wherein the stator has an outside diameter of no more than six inches.

21. The motor of claim 18, wherein the twelve stator poles are excited in three phases, with two pairs of diametrically opposed poles excited with magnetic fields of opposite polarity in each of the phases.

22. The motor of claim 21, wherein at least two phases are excited simultaneously when the torque of the motor from one of the two energized phases is at a minimum.

23. A variable reluctance motor with low torque ripple, suitable for operation as a servomotor, comprising:

a stator having a body and a plurality of teeth formed on poles projecting from the body;

a rotor having a plurality of teeth and mounted for motion relative to the stator; and means for electromagnetically exciting the stator teeth to provide magnetic motive force to the rotor;

at least three sets of stator windings; and phase control means for energizing simultaneously at least two sets of the windings during the times when the torque of the motor from one of the two energized sets of windings is at a minimum;

wherein the rotor teeth and the stator poles are equally spaced, and a stator tooth ratio, being the ratio of the width of the tip of a stator tooth to the width of the gap between stator teeth, is substantially equal to the rotor tooth ratio, being the ratio of the width of the tip of the rotor tooth to the width of the gap between rotor teeth.

24. A variable reluctance motor with low torque ripple, suitable for operation as a servomotor, comprising:

a stator having a body and a plurality of teeth formed on poles projected from the body;

a rotor having a plurality of teeth and mounted for motion relative to the stator; and means for electromagnetically exciting the stator teeth to provide magnetic motive force to the rotor;

wherein the rotor teeth and the stator poles are equally spaced, and a stator tooth ratio, being the ratio of the width of the tip of a stator tooth to the width of the gap between stator teeth, is substantially equal to a rotor tooth ratio, being the ratio of the width of the tip of a rotor tooth to the width of the gap between rotor teeth; and wherein the stator poles are excited in phases, and each stator pole having the same number of teeth, the number of rotor teeth is equal to the total number of stator teeth plus the number of stator poles excited in each phase.

* * * * *